Patented Apr. 21, 1953

2,636,034

UNITED STATES PATENT OFFICE 2,636,034

VAT DYESTUFF

Kenneth Alfred John Chamberlain, Blackley, Manchester, England, assignor to Imperial Chemical Industries Limited, a corporation of Great Britain No Drawing. Application November 20, 1950, Serial No. 196,725. In Great Britain November 30, 1949

2 Claims. (Cl. 260—276)

This invention relates to a new vat dyestuff and more particularly to a new olive green vat dyestuff which is especially valuable for use in printing.

In British Patent No. 410,552 it was proposed to manufacture new vat dyestuffs containing nitrogen by reacting with such nitrogenous compounds as contain in the molecule one or more replaceable hydrogen atoms attached to nitrogen, halogenated derivatives of condensation products which have been obtained according to British Patent No. 369,765 by treating "glyoxal-dianthraquinone" compounds with an acid condensing agent with or without previously converting them into alkali-condensed products. Amongst the halogenated derivatives of condensation products mentioned in the specification is that obtained from 1-chloroanthrone, namely $\alpha:\alpha$-dichloroacedianthrone. It was also proposed that where the nitrogenous compound used was an amino-compound of the anthraquinone series, the new vat dyestuffs should be further treated with acid condensing agents such as chlorosulphonic acid or aluminum chloride with or without the addition of diluents, or concentrated sulphuric acid, or also with caustic alkalies. It was suggested that in this further treatment ring-closure occurred with the formation of a carbazole derivative in a manner similar to that which occurs with anthrimides of the anthraquinone series.

In British Patent No. 453,853 it was proposed to manufacture similar compounds by reacting together amino-acedianthrones and compounds containing replaceable halogen atoms and then treating the products with acid-condensing agents or caustic alkalies.

I have now found that when the condensation product of one molecular proportion of $\alpha:\alpha$-dichloroacedianthrone and two molecular proportions of 6-amino-3':4'-phthaloylacridone is treated with acid condensing agents, there is obtained a valuable vat dyestuff. This new dyestuff dyes and prints cotton in strong olive green shades of excellent fastness to wet treatments and to light, and it is superior in printing properties to previously known olive green vat dyestuffs especially in its rapid building up and rapid development to full shades.

According to my invention therefore I provide as a new olive green vat dyestuff, the product obtainable by treating with acid condensing agents the condensation product of one molecular proportion of $\alpha:\alpha$-dichloroacedianthrone with 2 molecular proportions of 6-amino-3':4'-phthaloylacridone.

The 6-amino-3':4'-phthaloylacridone may be made by the process of British Patent No. 587,006 and the system of nomenclature and numbering used for this compound in the present specification is that indicated in British Patent No. 587,006.

The $\alpha:\alpha$-dichloroacedianthrone used in the process of my invention is that obtained from 1-chloroanthrone (which itself is obtained by reduction of 1-chloroanthraquinone), and the chlorine atoms are believed to be in the 7 and 15 positions in the acedianthrone nucleus. Accordingly the new dyestuff of my invention is believed to be substantially a compound of the following formula:

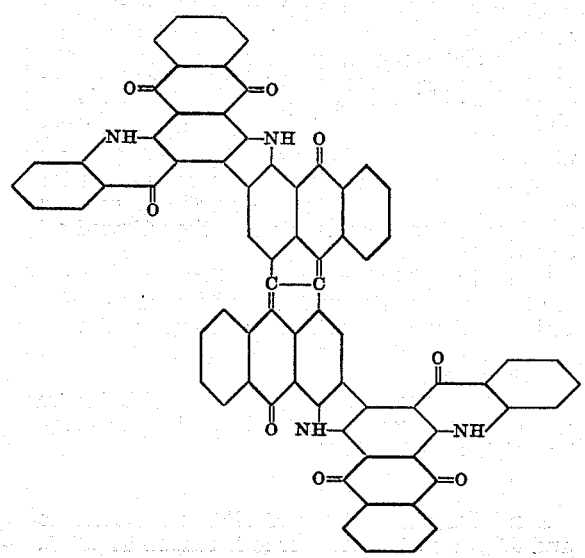

According to a further feature of my invention I provide a process for the manufacture of a new vat dyestuff which comprises treating with an acid condensing agent, the condensation product of one molecular proportion of α:α-dichloro-acedianthrone with two molecular proportions of 6-amino-3′4′-phthaloylacridone. This condensation product may be structurally represented as follows:

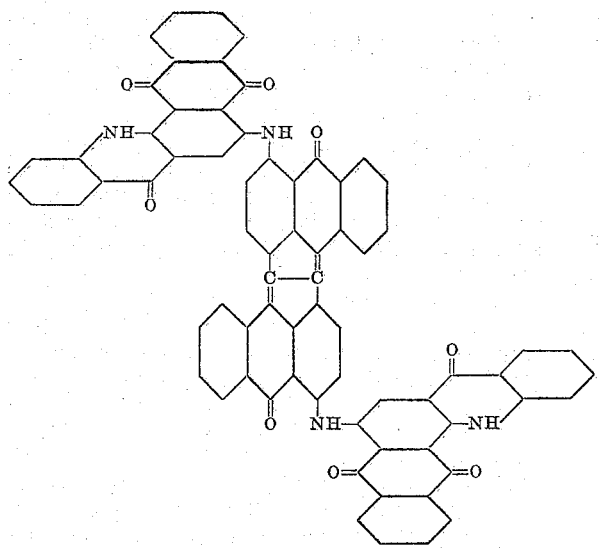

As suitable acid condensing agents there may be used aluminum chloride, with or without diluents, chlorosulphonic acid or sulphuric acid.

The reaction is conveniently carried out by heating the starting material with aluminum chloride in a diluent, for example nitrobenzene, at a suitable temperature, for example between 100° C. and 125° C. and the solid product may be isolated by pouring the reaction mixture into dilute hydrochloric acid, steam distilling off the nitrobenzene and filtering. The solid product may be dissolved in acid and reprecipated in ice and water, treated with an oxidising agent, for example sodium dichromate and then filtered off and dried.

The new dyestuff of my invention may be used for dyeing cellulosic textile materials, for example cotton and viscose artificial silk, but as already said it is especially valuable for use in textile printing processes.

The invention is illustrated but not limited by the following example in which the parts are by weight:

Example

A mixture of 15 parts of aluminium chloride and 50 parts of nitrobenzene is stirred at 60° C. and 5 parts of the condensation product of 1 molecular proportion of α:α-dichloroacedianthrone with 2 molecular proportions of 6-amino-3′:4′-phthaloylacridone obtained as described below, are added. The mixture is heated to 110–115° C. and kept at this temperature for 2½ hours. The mixture is then poured into dilute hydrochloric acid, the nitrobenzene is removed by steam distillation and the product is filtered off, washed with water and dried. The product is then dissolved in 75 parts of sulphuric acid (98%) and the solution is poured into 750 parts of a mixture of ice and water. 20 parts of 10% sodium bichromate solution are then added, the suspension is heated to 85° C. and kept at this temperature for 2 hours. The precipitate is then filtered off, washed acid free and dried.

The product is a black powder which gives a dark blue colour in concentrated sulphuric acid and dyes and prints cotton in strong olive green shades.

The starting material used in this example is made as follows:

47.5 parts of α:α-dichloroacedianthrone, 70 parts of 6-amino-3′:4′-phthaloylacridone, 27 parts of sodium carbonate, 8.4 parts of cuprous chloride and 4.2 parts of copper powder are stirred together in 840 parts of naphthalene at 215–220° C. for 24 hours. The reaction mixture is then cooled to 100–110° C. and pyridine is added. The precipitated product is filtered off and washed with pyridine until the washings are colourless and then with alcohol to remove all the pyridine. The resulting paste is suspended in dilute hydrochloric acid, boiled for a few minutes, filtered, washed acid-free and dried.

What I claim is:
1. The new olive green vat dyestuff of the formula
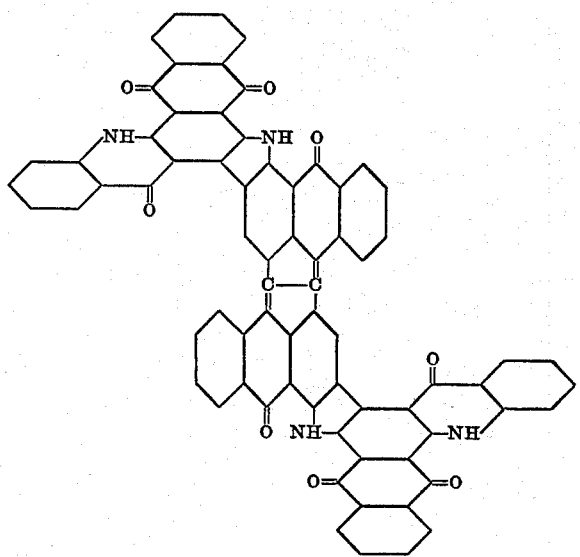
2. Process for the manufacture of a new vat dyestuff which comprises condensing the product having the following formula:
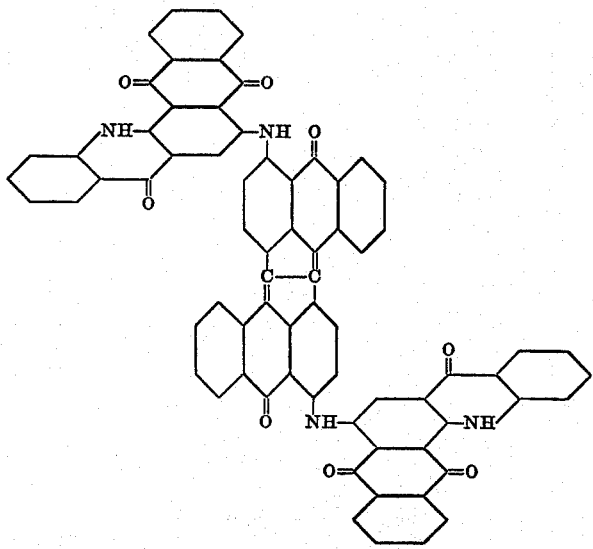
with an acid condensing agent.
KENNETH ALFRED JOHN
CHAMBERLAIN.
No references cited.